United States Patent [19]
Carvalho

[11] Patent Number: 4,962,991
[45] Date of Patent: Oct. 16, 1990

[54] QUICK-DISCONNECT WAVEGUIDE CONNECTOR ASSEMBLY

[75] Inventor: Ronald M. Carvalho, Boxborough, Mass.

[73] Assignee: Raytheon Company, Lexington, Mass.

[21] Appl. No.: 693,928

[22] Filed: Jan. 23, 1985

[51] Int. Cl.[5] .................... G02B 6/38
[52] U.S. Cl. .................... 350/96.21; 350/96.20
[58] Field of Search .................... 350/96.21, 96.20

[56] References Cited

U.S. PATENT DOCUMENTS

| | | | |
|---|---|---|---|
| 3,821,670 | 6/1974 | Thompson | 333/98 R |
| 4,447,121 | 5/1984 | Cooper et al. | 350/96.21 |
| 4,568,145 | 2/1986 | Colin et al. | 350/96.20 |

FOREIGN PATENT DOCUMENTS

| | | |
|---|---|---|
| 654135 | 6/1951 | United Kingdom . |
| 876394 | 8/1961 | United Kingdom . |
| 1205416 | 9/1970 | United Kingdom . |
| 1359066 | 6/1974 | United Kingdom . |
| 1119567 | 6/1975 | United Kingdom . |
| 2001480A | 1/1979 | United Kingdom . |
| 2140977A | 12/1984 | United Kingdom . |

*Primary Examiner*—William L. Sikes
*Assistant Examiner*—Robert E. Wise
*Attorney, Agent, or Firm*—Christopher L. Maginniss; Richard M. Sharkansky

[57] ABSTRACT

A quick connect/disconnect waveguide connector assembly is provided comprising first and second mating waveguide connectors. The first mating waveguide connector comprises a first outer member and a first insert disposed within the first outer member. The first insert has a mating portion having a generally conical shape truncated at a first face. The first insert further includes a waveguide slot disposed therethrough and intersecting the first face. The second mating waveguide connector comprises a second insert having a complementary mating portion. Such mating portion has a generally conical-shaped cavity therein truncated at a second face. The second insert further has a waveguide slot disposed therethrough and intersecting the second face. The second mating waveguide connector further comprises a second outer member rotatably mounted about the second insert. The first and second inserts include means for aligning the waveguide slots disposed therethrough with the waveguide slots having the same angular orientation about a common axis, upon mating the first and second inserts at the first and second mating portions thereof to engage the first and second faces thereof. The first and second outer members include means for locking the second outer member to the first outer member and maintaining the mating of the first and second inserts by rotating the second outer member about the first outer member through only a portion of a full turn.

7 Claims, 3 Drawing Sheets

QUICK-DISCONNECT WAVEGUIDE CONNECTOR ASSEMBLY

BACKGROUND OF THE INVENTION

This invention relates generally to waveguide connectors and more particularly to quick-disconnect waveguide connectors.

As is known in the art, a conventional waveguide connector generally comprises a flange formed on one end of the waveguide, with the waveguide opening located at the center of the flange, and a plurality of mounting holes disposed around the periphery of the flange. A waveguide connection is made by securing two such flanged connectors together by bolts or screws through the mounting holes of each flange. The waveguides generally are aligned by fitting guide pins on one flange into guide holes on the other flange.

While the above-described waveguide connector is satisfactory for use in some applications, such connector does not lend itself particularly well to applications where quick connection and disconnection is required.

SUMMARY OF THE INVENTION

In accordance with the present invention, a connector assembly is provided comprising a pair of waveguide sections arranged for propagating electromagnetic energy therethrough along a common axis. Means, having a portion thereof rotatable about a portion of one of such sections, are further provided for securing the pair of sections upon rotation of such portion of the securing means about said portion of said one of the sections. With such arrangement, a quick connect/disconnect waveguide connector assembly is provided.

Further in accordance with the present invention, a connector assembly is provided comprising a pair of mating inner members, each one of the pair of mating inner members having a waveguide disposed therethrough. A first outer member is rotatably mounted on the first inner member, and a second outer member is disposed on the second inner member. The first and second outer members include means for locking the first outer member to the second outer member, when the mating inner members are engaged, by rotating the first outer member through a portion of a full turn about the second outer member.

In a preferred embodiment of the invention, a connector assembly is provided comprising a pair of mating waveguide connectors. The first one of the pair of mating waveguide connectors comprises a first outer member and a first insert disposed within the first outer member. The first insert has a predetermined shape and further has a waveguide disposed therethrough. The second one of the pair of mating waveguide connectors comprises a second outer member and a second insert disposed within the second outer member, with the second outer member being rotatable with respect to the second insert. The second insert has a predetermined shape complementary to the predetermined shape of the first insert to thereby mate with the first insert upon engagement of the first and second waveguide connectors. The second insert further has a waveguide disposed therethrough. The first and second outer members include means for securing the first waveguide connector to the second waveguide connector upon rotating the second outer member through only a portion of a full turn about the first outer member and with each waveguide of the first and second inserts in predetermined alignment.

More particularly, a first mating waveguide connector is provided comprising a first outer member and a first insert disposed within the first outer member. The first insert has a mating portion having a generally conical shape truncated at a first face. The first insert further includes a waveguide slot disposed therethrough and intersecting the first face. A second mating waveguide connector is provided comprising a second insert having a complementary mating portion. Such mating portion has a generally conical-shaped cavity therein truncated at a second face. The second insert further has a waveguide slot disposed therethrough and intersecting the second face. The second mating waveguide connector further comprises a second outer member rotatably mounted about the second insert. The first and second inserts include means for aligning the waveguide slots disposed therethrough with said waveguide slots having the same angular orientation about a common axis, upon mating the first and second inserts at the first and second mating portions thereof to engage the first and second faces thereof. The alignment means may comprise a blade protruding from the conical-shaped first mating portion at a predetermined angle to the waveguide slot disposed through the first insert and a groove disposed in the second mating portion at the same predetermined angle with respect to the waveguide slot disposed through the second insert, the groove being adapted to receive the blade. The first and second outer members include means for locking the second outer member to the first outer member and maintaining the mating of the first and second inserts by rotating the second outer member about the first outer member through only a portion of a full turn.

BRIEF DESCRIPTION OF THE DRAWINGS

The forementioned objects and other features of the present invention may be fully understood by reference to the following detailed description taken in connection with the accompanying drawings wherein.

DESCRIPTION OF THE PREFERRED EMBODIMENT

Figure 1:
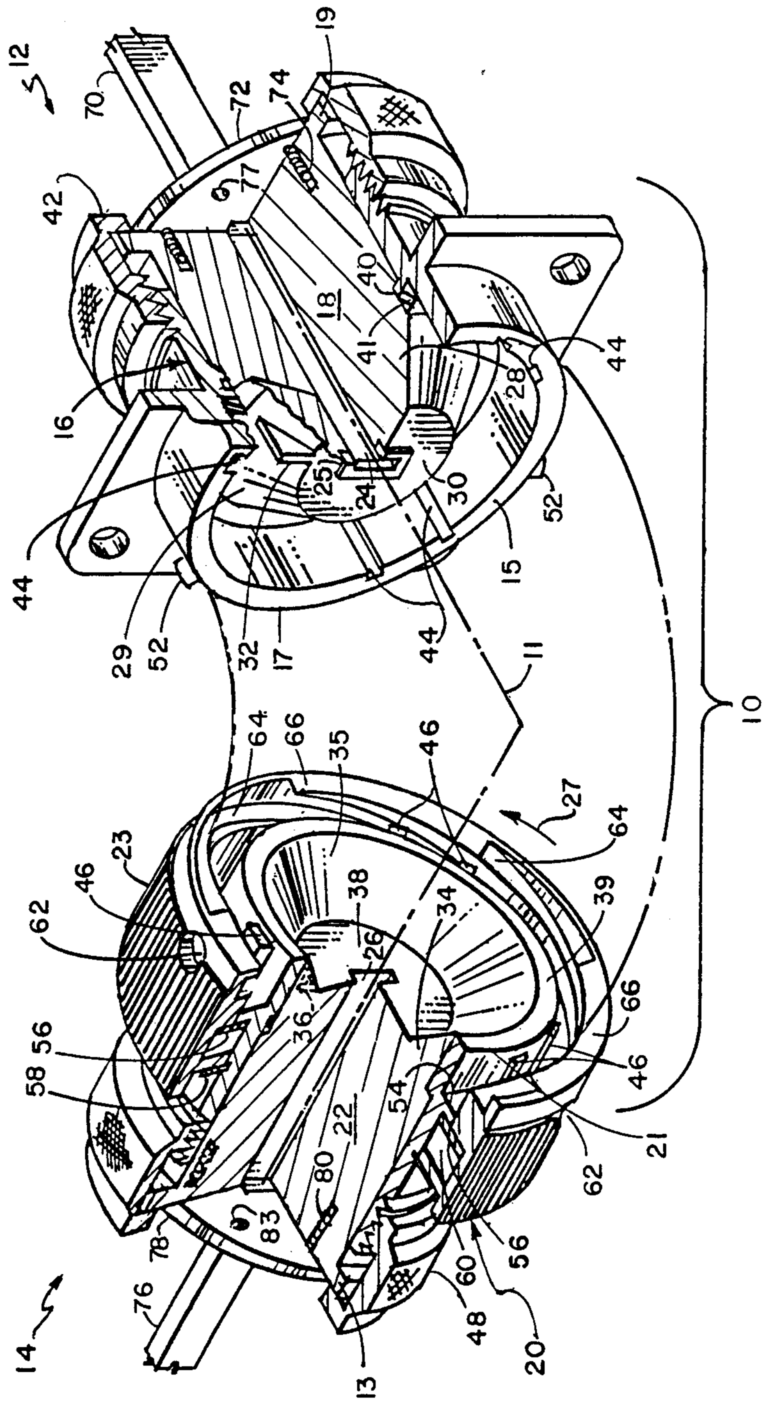
FIG. 1 is an isometric view, partially cut away, of a pair of mating waveguide connectors of a waveguide connector assembly according to the present invention.
Figure 2B:
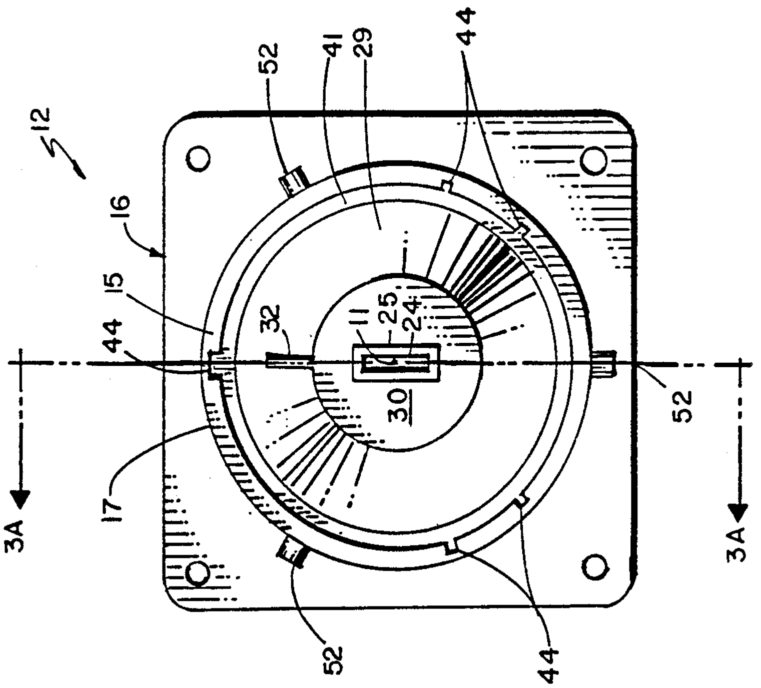
FIG. 2B is a front view of the other one of the pair of mating waveguide connectors of FIG. 1, specifically the connector shown on the right side of FIG. 1.
Figure 2A:
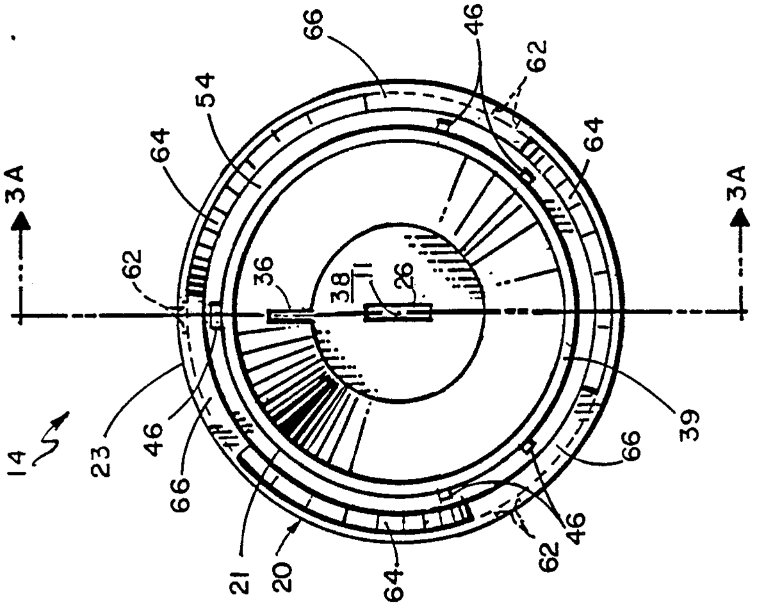
FIG. 2A is a front view of one of the pair of mating waveguide connectors of FIG. 1, specifically the connector shown on the left side of FIG. 1.

Referring now to FIG. 1, FIG. 2A and FIG. 2B, a pair of mating waveguide connectors 12, 14 of the waveguide connector assembly 10 of the present invention are shown. Connector 12 is a waveguide receptacle connector, here a bulkhead connector, and comprises shell 16 and insert 18. Connector 14 is a waveguide plug connector and comprises shell 20 and insert 22. While shell 16 is a single unit which is affixed to insert 18, shell 20 is a composite unit made up of an inner member 21 which is affixed to insert 22 and an outer member 23 which is rotatably mounted about the inner member 21. Shells 16, 20 are conventional, commercially available parts, here conforming to military specification number MIL-C-83723, and are here manufactured by ITT CANNON Electric, 666 E. Dyer Rd., Santa Ana, Calif. 92702, as part numbers PV70L24 (receptacle) and PV71L24 (plug). Inserts 18, 22 are mating waveguide sections (i.e. members) having suitable dimensions to enable propagation of electromagnetic energy therethrough along a common longitudinal axis 11. Here, inserts 18, 22 have rectangular waveguide slots 24, 26 disposed therethrough along axis 11. Waveguide slots 24, 26 are here dimensioned in a well known manner to enable propagation of electromagnetic energy in the operating band of the waveguide. Inserts 18, 22, as well as shells 16, 20 are fabricated from metallic material, here an aluminum alloy. Insert 18 has a mating portion 28 machined to form a frustum, that is, a cone truncated by face 30 disposed perpendicular to common axis 11. An alignment blade 32, press fit into a notch cut in frustum-shaped mating portion 28, projects, as shown, from sloped surfce 29 of frustum-shaped mating portion 28 at a predetermined angle to waveguide slot 24. Insert 22 of plug 14 has a mating portion 34 having a shape complementary to the shape of mating portion 28 of insert 18. Thus, insert 22 has a frustum-shaped cavity 35 formed therein to mate or engage with frustum-shaped mating portion 28 of receptacle 12. Groove 36, cut out of a portion of a sloped wall of cavity 34 at a predetermined angle to waveguide slot 26 receives alignment blade 32 and allows face 30 of insert 18 to engage face 38 of insert 22 when plug 14 is mated with receptacle 12 in a manner to be described. Face 38 is also disposed perpendicular to axis 11. The angles of alignment blade 32 and groove 36 with respect to waveguide slots 24, 26, respectively, are equal. Alignment blade 32 and groove 36 thus serve to align waveguide slots 24, 26 with each one of waveguide slots 24, 26 having the same angular orientation about the common longitudinal axis 11 of inserts 18, 22 when receptacle 12 and plug 14 are mated. The complementary conical shapes of mating portion 28 and cavity 34 provide planar alignment of faces 30, 38, and hence of waveguide slots 24, 26, when receptacle 12 and plug 14 are mated.

Figure 3A:
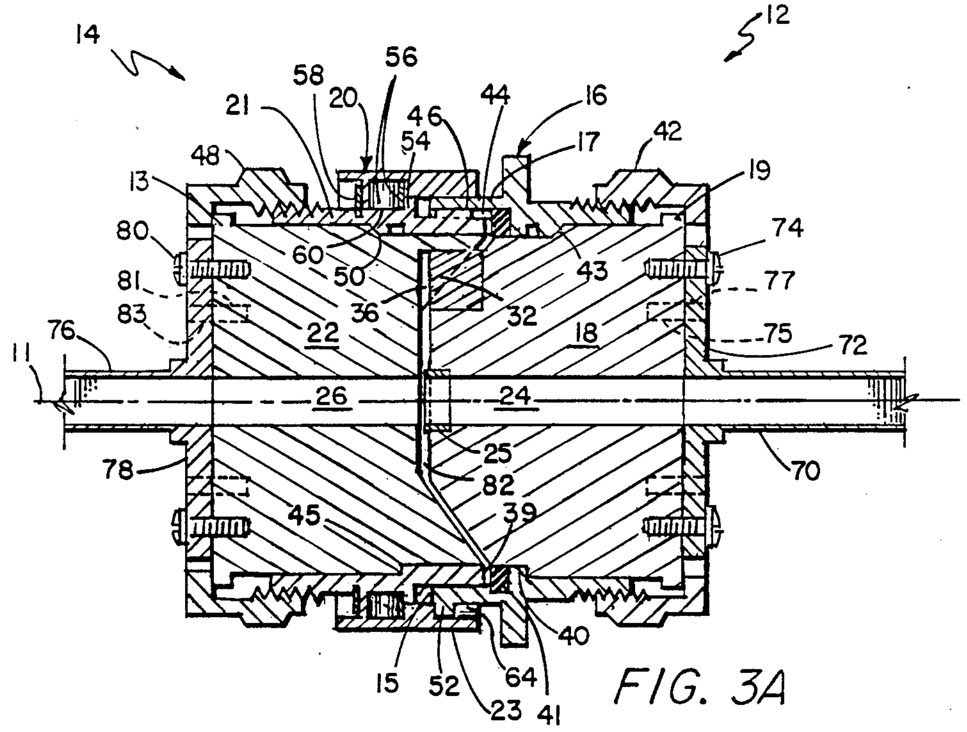
FIG. 3A is a cross-sectional view, taken along line 3A—3A of the connectors shown in FIG. 2A and FIG. 2B, here showing such connectors partially engaged.
Figure 3B:
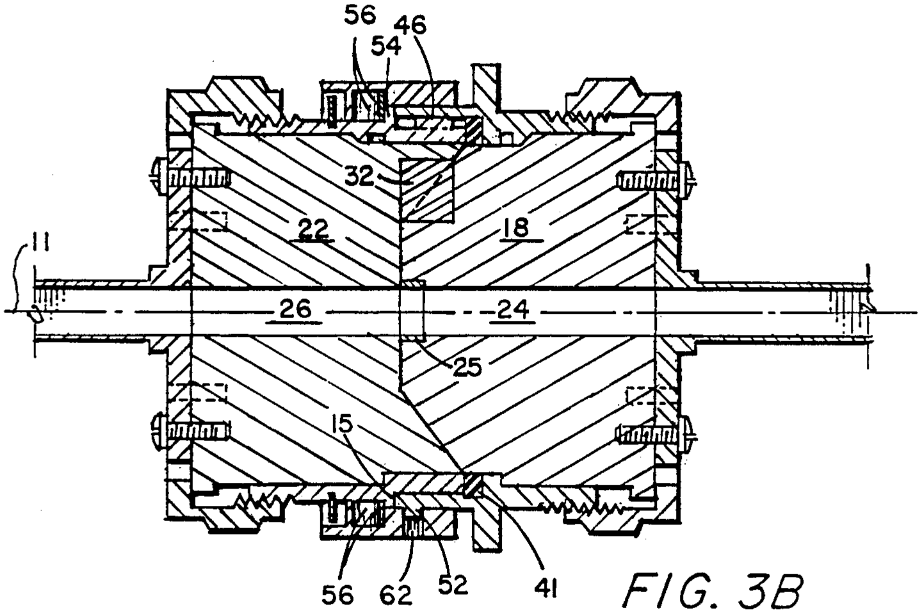
FIG. 3B is a cross-sectional view of the connectors shown in FIG. 2A and FIG. 2B, here showing the connectors fully engaged and with a rotatable outer member of the connector in FIG. 2A shown in a rotated position to effect locking of the fully engaged connectors.

Referring also to FIG. 3A and FIG. 3B, insert 18 is shown fit within shell 16 against rim 40 which extends a short distance into the interior of shell 16. FIG. 3A shows a cross-sectional view of plug 14 partially engaged with receptacle 12, while FIG. 3B shows a cross-sectional view of plug 14 and receptacle 12 fully engaged and locked. Insert 18 is held against rim 40 in a conventional manner by backshell 42, which threadably engages shell 16 as shown. Backshell 42 engages flaired portion 19 of insert 18 to urge insert 18 against rim 40 and secure insert 18 inside of shell 16. Conventional shell 16 also includes alignment key 43, disposed behind rim 40, which fits into a notch in insert 18 to align insert 18 (and thus alignment blade 32) at a predetermined rotational position with respect to conventional guide slots 44. Guide slots 44 are disposed in outer wall 17 of shell 16 in a predetermined pattern, as shown. Conventional guide tabs 46 are formed in the same predetermined pattern on the exterior surface of inner member 21 of shell 20 to allow inner member 21 to slide within outer wall 17 only when inner member 21 is positioned to align guide tabs 46 thereof with guide slots 44 of outer wall 17. A plurality, here three, of locking bayonets 52, the purpose of which will be described in detail hereinafter, are disposed in a triangular pattern around the exterior surface of outer wall 17.

Insert 22 is held within shell 20 similarly as insert 18 is held within shell 16. Insert 22 is shown fit against rim 45 extending inwardly around the circumference of inner member 21. Insert 22 is held against rim 45 in a conventional manner by backshell 48, which threadably engages inner member 21 as shown. Backshell 48 engages flaired portion 13 of insert 22 to urge insert 22 against rim 45 and secure insert 22 within shell 20. Conventional shell 20 also includes alignment key 50, disposed behind rim 45, which fits into a notch in insert 22 to position such insert (and groove 36) with respect to guide tabs 46 in the same rotational relationship as alignment blade 32 is positioned with respect to guide slots 44. A little thought reveals that such positioning is necessary in order that shells 16 and 20 and inserts 18 and 22 may mate properly.

Waveguide connections are made in a conventional manner to inserts 18, 22. Waveguide 70 is terminated at conventional waveguide flange 72 and is mounted onto insert 18 by screws 74, as shown. Waveguide 70 is axially aligned with waveguide slot 24 in a conventional manner by matching guide pins 75 press fit in insert 18 with guide holes 77 in flange 72 to provide waveguide slot 24 and waveguide 70 with the same angular orientation about common longitudinal axis 11. The connection between waveguide 70 and waveguide slot 24 is sealed using a conventional waveguide flange seal, not shown. Similarly, waveguide 76 terminates at conventional waveguide flange 78 and is secured to insert 22 by screws 80, as shown. Insert 22 includes guide pins 81 press fit therein which fit into guide holes 83 in flange 78 to axially align waveguide 76 with waveguide slot 26 in a conventional manner and provide waveguide slot 26 and waveguide 76 with the same angular orientation about common longitudinal axis 11. A conventional waveguide seal, not shown, is used to seal the connection between waveguide 76 and waveguide slot 26.

Inner member 21 of shell 20 is rotatably mounted within outer member 23 in a conventional manner as with ITT CANNON part number PV71L24. Briefly, ridge 54 of inner member 21 engages spring 56 and is held thereagainst by removeable keeper ring 58, which fits into a shallow groove, not numbered, of inner number 21. Spring 56 is disposed in slot 60 of outer member 23 and is a generally circular metal ring having bends therein to provide spring 56 with a three-dimensional shape which is compressed in a manner to be described when plug 14 is mated with and locked onto receptacle 12. Rotatable outer member 23 additionally has a plurality, here three, of holes 62 disposed therethrough, such holes being arranged around rotatable outer member 23 in the same triangular pattern as are locking bayonets 52 around shell 16 of receptacle 12. A plurality, here three, of inclined tracks 64 are disposed in the walls of rotatable outer member 23, each track beginning at front face 66 of rotatable outer member 23 and terminating at a corresponding one of the plurality of holes 62. Each track 64 extends around only a portion of the circumference of outer member 23. The plurality of inclined tracks 64 are adapted to receive the plurality of locking buttons 52 on shell 16 and, with alignment blade 32 aligned with groove 36 and guide tabs 46 aligned with guide slots 44, provide a camming surface to guide locking bayonets 52 into holes 62 upon turning rotatable outer member 23 through only a portion of a full turn in the direction of arrow 27 (FIG. 1), thus securing plug 14 to receptacle 12 and firmly mating inserts 18, 22 and waveguide slots 24, 26. When plug 14 is mated with receptacle 12 and rotated as described above, three sets of surfaces come into contact: face 38 of insert 22 engages face 30 of insert 18; front surface 39 of inner member 21 meets seal 41 disposed around rim 40; and front surface 15 of shell 16 contacts ridge 54 of inner member 21. As outer member 23 is rotated and plug 14 pushed onto receptacle 12, the contact made at the above-described three sets of surfaces forces ridge 54 of inner member 21 to compress spring 56. Thus, when locking bayonets 52 are seated into holes 62, compressed spring 56 urges outer member 23 away from receptacle 12 with sufficient force to retain locking bayonets 52 in holes 62 and lock plug 14 onto receptacle 12. A little thought reveals that plug 14 may be quickly disconnected from receptacle 12, and waveguide slots 24, 26 decoupled, by rotating outer member 23 through a portion of a full turn in a direction opposite that of arrow 27 with sufficient pressure to overcome the force of spring 56.

The events that occur when plug 14 is mated with and locked onto receptacle 12 may be completely understood by referring to and comparing FIG. 3A and FIG. 3B. FIG. 3A illustrates a cross-sectional view of plug 14 and receptacle 12 partially mated. Alignment blade 32 of insert 18 is partially inserted into groove 36 of insert 22 to axially align waveguide slots 24, 26 and provide each waveguide slot 24, 26 with the same angular orientation about common axis 11, and guide tabs 46 of inner member 21 have been introduced into guide slots 44 to allow inner member 21 to slide within outer wall 17 of shell 16. As complete mating has not occurred, a space 82 is present between faces 30, 38 of inserts 18, 22, respectively. To ensure that the connection between waveguide slots 24, 26, once made, is properly sealed, seal 25 is disposed in a recess formed in waveguide slot 24 at face 30. Seal 25 is here fabricated from coin silver, although other material such as indium may be used, and projects slightly from face 30, as shown in FIG. 3A. As also shown in FIG. 3A, front surface 39 has not yet contacted seal 41 on rim 40, nor has front surface 15 of shell 16 engaged ridge 54 of inner member 21. Locking bayonet 52 is shown in inclined track 64.

Inserts 18, 22 are mated, and plug 14 is locked onto receptacle 12, by simultaneously pressing plug 14 onto receptacle 12 and turning rotatable outer member 23 of plug 14 in the direction of arrow 27 in FIG. 1 (out of the page in FIGS. 3A, 3B) until locking bayonets 52 are seated in holes 62 of outer member 23. Since each one of the plurality of inclined tracks 64 which guide locking bayonets 52 into holes 62 extends around only a portion of the circumference of rotatable outer member 23, outer member 23 need be rotated through only a portion of a full turn in the direction of arrow 27 to guide locking bayonets 52 into holes 62 and lock plug 14 onto receptacle 12. It is noted here that rotatable outer member 23 rotates about the common longitudinal axis 11 of inserts 18, 22, along which waveguide slots 24, 26 respectively, are disposed.

FIG. 3B illustrates a cross-section of plug 14 and receptacle 12 securely mated and locked in the manner described above. It is seen that alignment blade 32 is fully inserted into groove 36 and guide tabs 46 are completely seated in guide slots 44, thus allowing inner member 21 of plug 14 to fully slide within outer wall 17 of receptacle 12 and faces 30, 38 of inserts 18, 22 to come in complete contact. It is noted here that the conical shape of insert 18 and of the cavity formed in insert 22 provide for reliable planar alignment between faces 30, 38, and between waveguide slots 24, 26, when plug 14 and receptacle 12 are mated. To put it another way, the conical shape of insert 18 and of the cavity formed in insert 22 force faces 30, 38, and thus waveguide slots 24, 26, to meet along common axis 11 rather than at an acute angle to common axis 11 when plug 14 and receptacle 12 are mated. This insures that seal 25 will be everywhere compressed around the junction of waveguide slots 24, 26 to fully seal the waveguide connection and prevent moisture from entering waveguide slots 24, 26. As stated previously, alignment of alignment blade 32 with groove 36 axially aligns waveguide slots 24, 26 and provides each waveguide slot 24, 26 with the same angular orientation about common axis 11. Therefore, when plug 14 and receptacle 12 are securely mated and locked a common waveguide path is provided through mated connectors 12, 14 along common axis 11, such common waveguide path having a substantially uniform cross-sectional area everywhere through mated connectors 12, 14.

Comparing FIG. 3A with FIG. 3B, it is further seen that as outer member 23 is rotated through a portion of a full turn about shell 16 in the direction of arrow 27 and plug 14 is pressed onto receptacle 12, inner member 21 front surface 39 of plug 14 engages seal 41 on rim 40 of receptacle 12 and front surface 15 of receptacle 12 meets ridge 54 on inner member 21 of plug 14. The contact of such surfaces, as well as that between faces 30, 38, forces spring 56 in plug 14 to compress. Thus, as shown in FIG. 3B, when outer member is rotated sufficiently to guide locking bayonets 52 into holes 62, compressed spring 56 exerts force against outer member 23 to hold locking bayonets 52 within holes 62 and lock plug 14 onto receptacle 12. A little thought reveals that the force of compressed spring 56 also securely holds inserts 18, 22 together at faces 30, 38 thereof.

From the foregoing it is seen that the present invention provides a waveguide connector assembly that can be rapidly connected by following a two step procedure: (1) aligning alignment key 32 of insert 18 with groove 36 of insert 22 and aligning guide tabs 46 of plug 14 with guide slots 44 of receptacle 12; and (2) pressing plug 14 onto receptacle 12 while simultaneously turning rotatable outer member 23 through only a portion of a full turn in the direction of arrow 27 in FIG. 1 until locking bayonets 52 are guided by inclined tracks 64 into holes 62 and held therein by the force of compressed spring 56.

The connector assembly may quickly be disconnected by following the reverse procedure. That is, outer member 23 is rotated through a portion of a full turn in the opposite direction as that of arrow 27 with sufficient force to overcome that of compressed spring 56 and urge locking bayonets 52 out of holes 62. Additional such rotation of outer member 23 guides locking bayonets 52 up inclined tracks 64. Plug 4 may then be pulled straight out of shell 14, disengaging alignment blade 32 from groove 36 and guide tabs 46 from guide slots 44.

Although a preferred embodiment of the present invention has been described, modifications and alterations thereof may become apparent to those of ordinary skill in the art. For example, the invention may be practiced using waveguide sections having other than slotted waveguide openings. Also, the waveguide sections (e.g. inserts 18, 22) may have other than conical shapes, so long as equivalents to alignment blade 32 and groove 36 are included to axially align the mating waveguide sections to provide each of the sections with the same angular orientation about common axis 11. Also, the invention is not limited to the use of ITT CANNON shells; any shells of the same general type may be employed. Thus, it is understood that the scope of the present invention is to be limited only by the scope of the appended claims.

What is claimed is:

1. A connector assembly comprising:

a pair of connectors, a first one of the pair of connectors comprising a first mating inner member having a protruding region, and a second one of the pair of connectors comprising a second mating inner member comprising cavity means for receiving the protruding region, said first mating inner member having a radio frequency energy waveguide opening disposed through the protruding region thereof, and said second mating inner member having a radio frequency energy waveguide opening disposed therethrough and terminating at the cavity means thereof;

said first connector comprising a first outer member rotatably mounted on the first mating inner member;

said second connector comprising a second outer member disposed on the second mating inner member; and wherein the first and second outer members include means for locking the first outer member to the second outer member, when the protruding region of the first mating inner member is received by the cavity means of the second mating inner member, upon rotation of the first outer member through a portion of a full turn about the second outer member.

2. The connector assembly of claim 1 wherein the first and second mating inner members further comprise means for radially aligning the radio frequency energy waveguide openings of the first and second mating inner members about a common axis when the protruding region is received by the cavity means.

3. The connector assembly of claim 2 wherein the alignment means comprises:

a key disposed on the protruding region of the first mating inner member; and a groove disposed in the cavity means of the second mating inner member and adapted to receive said key.

4. A connector assembly comprising:

(a) a first mating waveguide connector comprising:

(i) a first outer member; and (ii) a first inner member disposed within the first outer member, said first inner member comprising a protruding region having a predetermined shape and having a waveguide opening disposed therethrough;

(b) a second mating waveguide connector comprising:

(i) a second outer member; and (ii) a second inner member disposed within the second outer member with the second outer member being rotatable with respect to the second inner member, said second inner member comprising a cavity region having a predetermined shape complementary to the predetermined shape of the protruding region of the first inner member to mate with the first inner member upon engagement of the first and second waveguide connectors, said second inner member further having a waveguide opening disposed therethrough and terminating at said cavity region; and (c) wherein the first and second outer members include means for securing the first waveguide connector to the second waveguide connector upon rotating the second outer member through only a portion of a full turn about the first outer member and with the waveguide openings of the first and second inner members in predetermined alignment.

5. In combination:

(a) a first mating waveguide connector comprising:

(i) a first outer member; and (ii) a first insert disposed within the first outer member, said first insert having a first mating portion having a generally conical shape truncated at a first face, said first insert further having a waveguide slot disposed therethrough and intersecting said first face;

(b) a second mating waveguide connector comprising:

(i) a second insert having a second mating portion, said second mating portion having a generally conical-shaped cavity means therein for receiving the first mating portion of the first insert, said cavity means being truncated at a second face, said second insert further having a waveguide slot disposed therethrough and intersecting said second face; and (ii) a second outer member rotatably mounted about the second insert;

(c) wherein said first and second inserts include means for aligning the waveguide slots disposed therethrough with the waveguide slots having the same angular orientation about a common axis, upon mating the first and second inserts at the first and second mating portions thereof to engage the first and second faces thereof; and (d) wherein the first and second outer members include means for locking the second outer member to the first outer member and maintaining the mating of the first and second inserts upon rotation of the second outer member about the first outer member through only a portion of a full turn.

6. The combination of claim 5 wherein said aligning means comprises:

a blade protruding from the conical-shaped first mating portion of the first insert at a predetermined angle to the waveguide slot disposed through the first insert; and a groove disposed in the second mating portion of the second insert at a predetermined angle to the waveguide slot disposed through the second insert, said groove being adapted to receive said blade.

7. A connector assembly comprising:

a pair of connectors, a first one of the pair of connectors comprising a first mating inner member having a protruding region, and a second one of the pair of connectors comprising a second mating inner member comprising cavity means for receiving the protruding region, each one of said inner members having a radio frequency energy waveguide disposed therethrough;

said first connector comprising a first outer member rotatably mounted on the first mating inner portion;

said second connector comprising a second outer member disposed on the second mating inner member; and wherein the first and second outer members include means for locking the first outer member to the second outer member, when the protruding region of the first mating inner member is received by the cavity means of the second mating inner member, upon rotation of the first outer member through a portion of a full turn about the second outer member.

* * * * *